A. BRIGHTMAN.
STOVE-PIPE DAMPER.
No. 191,646.  Patented June 5, 1877.
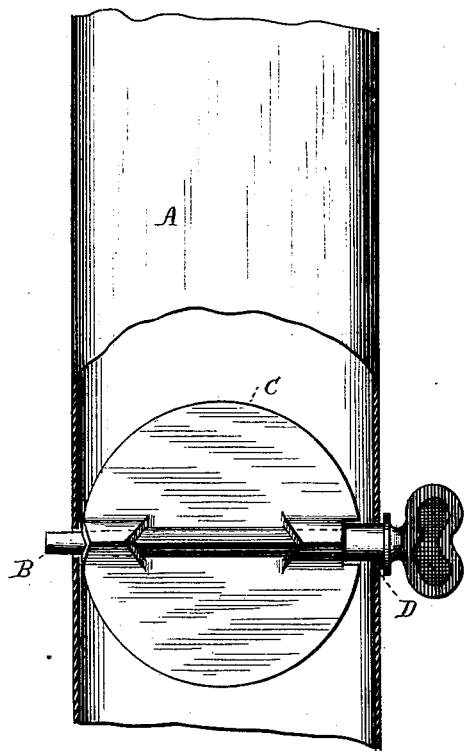
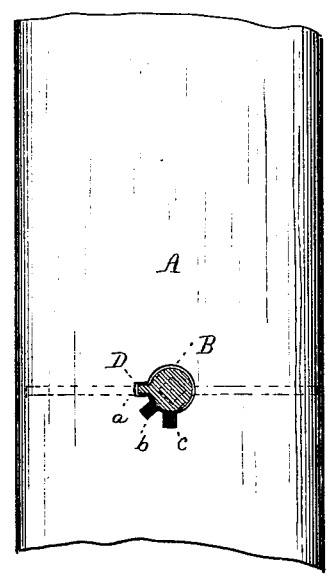
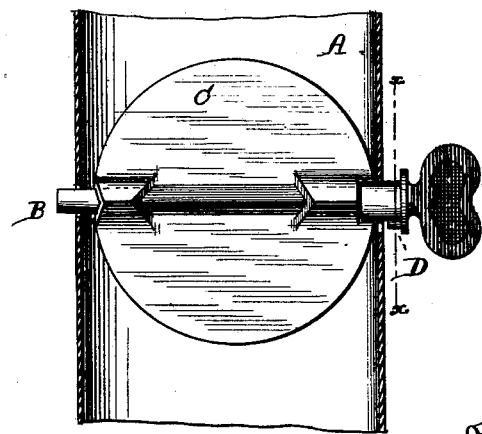
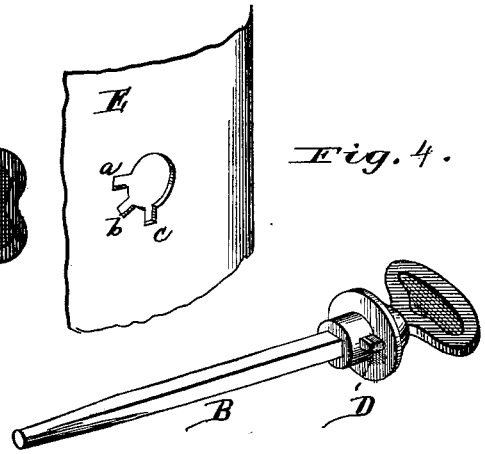

UNITED STATES PATENT OFFICE.

ALBERT BRIGHTMAN, OF NEW BEDFORD, MASSACHUSETTS.

IMPROVEMENT IN STOVE-PIPE DAMPERS.

Specification forming part of Letters Patent No. 191,646, dated June 5, 1877; application filed February 20, 1877.

*To all whom it may concern:*

Be it known that I, ALBERT BRIGHTMAN, of New Bedford, in the county of Bristol and State of Massachusetts, have invented certain new and useful Improvements in Stove-Pipe Dampers, of which the following is a specification:

This invention relates to certain improvements in that class of stove-pipe dampers in which provision is made to retain the damper in any desired position.

Heretofore this has been accomplished by means of a small plate adapted to be fastened to the stove-pipe opposite one of the apertures through which the spindle passes, said plate having an opening for the spindle, provided with teeth or notches, in which a lug or projection on the spindle may be made to engage to fasten the damper in position. These devices are expensive and difficult to attach to the stove-pipe, and my invention is designed to obviate these defects.

To this end my invention consists in forming a series of notches or slots directly in the metal of the stove-pipe, at the edge of the opening for the damper-spindle, said spindle being provided with a lug or projection to engage therein.

In the drawing, Figure 1 represents a view, partly in elevation and partly in section, of a stove-pipe with my improved damper applied thereto, showing the damper in a locked position. Fig. 2 represents a sectional view, showing the damper unlocked. Fig. 3 represents an elevation of the stove-pipe and damper; and Fig. 4, a detached view of a portion of the stove-pipe, showing the spindle-aperture and the spindle removed.

The letter A represents a stove-pipe of ordinary construction, provided with the usual apertures for the spindle. One of said apertures, at its edge, is provided with a series of notches, teeth, or recesses, as shown at $a\ b\ c$, with which the lug D on the damper is adapted to engage.

The damper is preferably formed with a shoulder just back of the handle, which sets and turns in the spindle-aperture in the stove-pipe.

By making the notches or recesses directly in the metal of the stove-pipe, the use of the plates heretofore employed is dispensed with, and the notches can be cheaply and rigidly formed by means of a punch or die, avoiding the difficulty experienced in attaching the plates ordinarily employed.

What I claim, and desire to secure by Letters Patent, is—

The notches $a\ b\ c$, formed directly in the stove-pipe at the spindle-aperture, in combination with the spindle B of the damper, provided with a lug, D, to engage in said notches, substantially as herein set forth.

In testimony that I claim the foregoing I have hereunto set my hand in the presence of the subscribing witnesses.

ALBERT BRIGHTMAN.

Witnesses:
EDWIN L. BARNES,
ISAAC A. BARNES.